United States Patent
Guay et al.

(10) Patent No.: US 10,445,940 B2
(45) Date of Patent: Oct. 15, 2019

(54) MODELING INTERACTIONS BETWEEN SIMULATED CHARACTERS AND REAL-WORLD OBJECTS FOR MORE REALISTIC AUGMENTED REALITY

(71) Applicants: DISNEY ENTERPRISES, INC., Burbank, CA (US); ETH Zürich, Zürich (CH)

(72) Inventors: Martin Guay, Zurich (CH); Gökçen Çimen, Zurich (CH); Dominik Tobias Borer, Zurich (CH); Simone Guggiari, Zurich (CH); Ye Yuan, Pittsburgh, PA (US); Stelian Coros, Zurich (CH); Robert Walker Sumner, Zurich (CH)

(73) Assignees: DISNEY ENTERPRISES, INC., Burbank, CA (US); ETH ZÜRICH, Zürich (CH)

( * ) Notice: Subject to any disclaimer, the term of this patent is extended or adjusted under 35 U.S.C. 154(b) by 0 days.

(21) Appl. No.: 15/922,820

(22) Filed: Mar. 15, 2018

(65) Prior Publication Data

US 2019/0287305 A1    Sep. 19, 2019

(51) Int. Cl.
*G09G 5/00*    (2006.01)
*G06T 19/00*    (2011.01)
(Continued)

(52) U.S. Cl.
CPC ........ *G06T 19/006* (2013.01); *G02B 27/0172* (2013.01); *G06T 15/205* (2013.01); *G02B 2027/0138* (2013.01); *G06T 2215/16* (2013.01)

(58) Field of Classification Search
CPC .. G06T 19/006; G06T 15/205; G02B 27/0172
See application file for complete search history.

(56) References Cited

U.S. PATENT DOCUMENTS 7,564,469 B2    7/2009  Cohen
8,405,680 B1 *  3/2013  Cardoso Lopes ....... G06T 19/00
                                                  345/426
(Continued)

OTHER PUBLICATIONS

Wu et al., "Current status, opportunities and challenges of augmented reality in education", Computers & Education 62, Dec. 31, 2013, pp. 41-49, retrieved from https://pdfs.semanticscholar.org/fd28/a381d483d936590ae01a6009e1e2e5d3362f.pdf.
(Continued)

*Primary Examiner* — Sarah Lhymn
(74) *Attorney, Agent, or Firm* — Artegis Law Group, LLP (57) ABSTRACT

A simulation engine models interactions between a simulated character and real-world objects to produce a physically realistic augmented reality (AR) simulation. The simulation engine recognizes a given real-world object and then identifies, within a library of object models, an object model corresponding to that object. The simulation engine projects the object model onto the real-world object such that the object model is geometrically aligned with the real-world object. When the simulated character encounters the real-world object, the simulation engine models interactions between the simulated character and the real-world object by adjusting the kinematics of the simulated character relative to the object model associated with the real-world object.

20 Claims, 10 Drawing Sheets

(51) Int. Cl.
*G02B 27/01* (2006.01)
*G06T 15/20* (2011.01)

(56) References Cited

U.S. PATENT DOCUMENTS

| | | | |
|---|---|---|---|
| 8,963,805 | B2 | 2/2015 | Sugden et al. |
| 9,132,342 | B2 | 9/2015 | Balachandreswaran et al. |
| 9,286,725 | B2 | 3/2016 | Vasquez, II et al. |
| 9,342,610 | B2 | 5/2016 | Liu et al. |
| 9,348,141 | B2 | 5/2016 | Bar-Zeev et al. |
| 9,454,849 | B2 | 9/2016 | Mount et al. |
| 9,552,673 | B2 | 1/2017 | Hilliges et al. |
| 9,724,609 | B2 | 8/2017 | Kochi et al. |
| 9,741,145 | B2 | 8/2017 | Mitchell et al. |
| 9,911,243 | B2 * | 3/2018 | Vats .................. G06T 19/20 |
| 2007/0126733 | A1 * | 6/2007 | Yang .................. G06F 3/011 345/419 |
| 2012/0206452 | A1 * | 8/2012 | Geisner .............. G02B 27/017 345/419 |
| 2013/0141419 | A1 | 6/2013 | Mount et al. |
| 2013/0286004 | A1 * | 10/2013 | McCulloch .......... G06T 19/006 345/419 |
| 2014/0361977 | A1 | 12/2014 | Stafford et al. |
| 2016/0140733 | A1 * | 5/2016 | Gu ...................... H04N 5/247 348/43 |
| 2016/0148433 | A1 * | 5/2016 | Petrovskaya ........ G06T 19/006 345/633 |
| 2016/0307374 | A1 * | 10/2016 | Kurz .................... G06T 19/006 |
| 2016/0350973 | A1 * | 12/2016 | Shapira ................ G06T 19/006 |
| 2017/0151484 | A1 | 6/2017 | Reilly et al. |

OTHER PUBLICATIONS

Heun et al., "Smarter Objects: Using AR technology to Program Physical Objects and their Interactions", CHI 2013 Extended Abstracts, Apr. 27-May 2, 2013, Paris, France, Retrieved From http://fluid.media.mit.edu/sites/default/files/WIP_Smarter Objects_0.pdf.

Huang et al., "Ubii: Towards Seamless Interaction between Digital and Physical Worlds", MM '15, Oct. 30, 2015, retrieved from http://symlab.ust.hk/papers/ubii.pdf.

Leighton et al., "Augmented Reality in K-12 Education", Mobile Technologies and Augmented Reality in Open Education, Chapter 14, Feb. 28, 2017, retrieved from https://www.researchgate.net/profile/Helen_Crompton/ publication/314119800_Augmented_Reality_in_K-12_Education/links/598b8b83458515c333a339e5/Augmented-Reality-in-K-12-Education.pdf.

Roo et al., "One Reality: Augmenting How the Physical World is Experienced by combining Multiple Mixed Reality Modalities", Aug. 30, 2017, pp. 787-795, retrieved from https://vimeo.com/231679882; See also: https://www.researchgate.net/publication/320570015_One_Reality_Augmenting_How_the_Physical_Worlds_Experienced_by_combining_Multiple_Mixed_Reality_Modalities.

Mavridis et al., "The IbnSina Center: An Augmented Reality Theater with Intelligent Robotic and Virtual Characters", The 18th IEEE International Symposium on Robot and Human Interactive Communication, Toyama, Japan, Sep. 27-Oct. 2, 2009, pp. 681-686.

Zeng et al., "Aristo: An Augmented Reality Platform for Immersion and Interactivity", MM '17, Oct. 23-27, 2017, Mount View, CA, USA, © 2017 Association for Computing Machinery, 9 pages, https://doi.org/10.1145/3123266.3123308.

Dow et al., "Initial Lessons From AR Facade, An Interactive Augmented Reality Drama", ACE '06, Jun. 14-16, 2006, Hollywood, CA, USA, Copyright 2006 ACM, 8 pages.

Cimen et al., "Interacting with Intelligent Characters in AR", Workshop on Artificial Intelligence Meets Virtual and Augmented Worlds (AIVRAR) 2017, Nov. 15, 2017, 6 pages, retrieved from https://www.disneyresearch.com/publication/interacting-intelligent-characters-ar/.

Billinghurst et al., "Mixing Realities in Shared Space: An Augmented Reality Interface for Collaborative Computing", IEEE, Multimedia and Expo, 2000, ICME 2000, 2000 IEEE International Conference on Jul. 30-Aug. 2, 2000, New York, NY, USA, 6 pages.

"Introducing ARKit", Apple, iOS 11, Watch "Introducing ARKit: Augmented Reality for iOS" from WWDC17, 2 pages.

* cited by examiner

MODELING INTERACTIONS BETWEEN SIMULATED CHARACTERS AND REAL-WORLD OBJECTS FOR MORE REALISTIC AUGMENTED REALITY

BACKGROUND

Field of the Various Embodiments

Embodiments of the present invention relate generally to computer simulations and, more specifically, to modeling interactions between simulated characters and real-world objects for more realistic augmented reality.

Description of the Related Art

A conventional augmented reality (AR) system includes a console that generates and renders graphics and a headset that displays these graphics to a user. The graphics typically represent objects, characters, and other simulated elements commonly found in computer simulations. The headset includes a stereoscopic display that displays slightly different versions of the graphics to each eye of the user, thereby causing these simulated elements to appear to the user in three dimensions. The headset also allows the user to view the real world. Thus, the headset enables the simulated elements to appear to the user within the real world simultaneously alongside real-world objects, thereby augmenting reality.

As a general matter, a conventional console can generate detailed simulated elements and a conventional headset can then display these simulated elements with a high degree of realism. However, this realism breaks down when the console causes the headset to display a given simulated element that is touching or otherwise contacting a real-world object. In particular, the console cannot generate the simulated element in a manner that respects the physical boundaries of the real-world object. Consequently, the simulated element can sometimes appear to physically intersect the real-world object instead of touching or contacting the real-world object. This behavior is physically unrealistic and can therefore lead to a poor user experience.

As the foregoing illustrates, what is needed in the art are ways to generate more realistic interactions between simulated elements/objects and real-world objects in AR implementations.

SUMMARY

Various embodiments include a computer-implemented method for generating simulated characters within augmented reality (AR) simulations, including mapping a first real-world object to a first object model, where the first object model includes first geometry corresponding to the structure of the first real-world object, projecting the first geometry onto the first real-world object within an AR simulation, determining that a first portion of a simulated character included in the AR simulation occupies a first position within the AR simulation that is associated with the first real-world object, and generating a kinematic model of the simulated character based on the first object model, where the kinematic model of the simulated character models an interaction between the simulated character and the first real-world object, and wherein the simulated character is subsequently displayed to a user via an AR headset.

At least one advantage of the disclosed techniques is that the simulation engine produces AR simulations that are more physically realistic compared to conventional AR simulations. In particular, the simulated elements generated by the simulation engine may appear to interact with real-world objects in a realistic manner without physically intersecting with those objects. Accordingly, the disclosed techniques represent a technological advancement compared to previous approaches, because previous approaches cause unrealistic behavior that is disruptive to the user experience.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, conventional AR consoles cannot generate simulated elements that interact with real-world objects in a realistic manner. Specifically, AR consoles generate simulated elements that may appear to physically intersect real-world objects. This behavior may appear unrealistic to the user, resulting in a poor user experience.

To address these issues, embodiments of the invention include a simulation engine that models interactions between simulated elements and real-world objects to produce a physically realistic AR simulation. Initially, the simulation engine generates a library of object models by scanning a set of real-world objects. The simulation engine then generates the AR simulation to appear within a region of the environment that includes one or more of those real-world objects. The simulation engine recognizes a given real-world object residing in this region and then identifies an object model corresponding to that object.

Within the AR simulation, the simulation engine projects the object model onto the real-world object such that the object model is geometrically aligned with the real-world object. The simulation engine need not explicitly display the object model to the user, although doing so is possible. The simulation engine performs this projection process with each real-world object included in the region of the environment where the AR simulation is generated to appear. The simulation engine may then cause simulated elements to appear within the AR simulation, including static elements such as simulated objects, as well as dynamic elements, such as simulated characters. When a given simulated element encounters a real-world object, the simulation engine models interactions between the simulated element and the real-world object by adjusting the kinematics of the simulated element relative to the object model associated with the real-world object. Because the object model is geometrically aligned to the real-world object, the simulation engine can model these interactions in a manner that is highly precise and therefore capable of avoiding intersections between the simulated element and the real-world object.

At least one advantage of the disclosed techniques is that the simulation engine produces AR simulations that are more physically realistic compared to conventional AR simulations. In particular, the simulated elements generated by the simulation engine may appear to interact with real-world objects in a realistic manner without physically intersecting with those objects. Accordingly, the disclosed techniques represent a technological advancement compared to previous approaches, because previous approaches cause unrealistic behavior that is disruptive to the user experience.

System Overview

Figure 1:
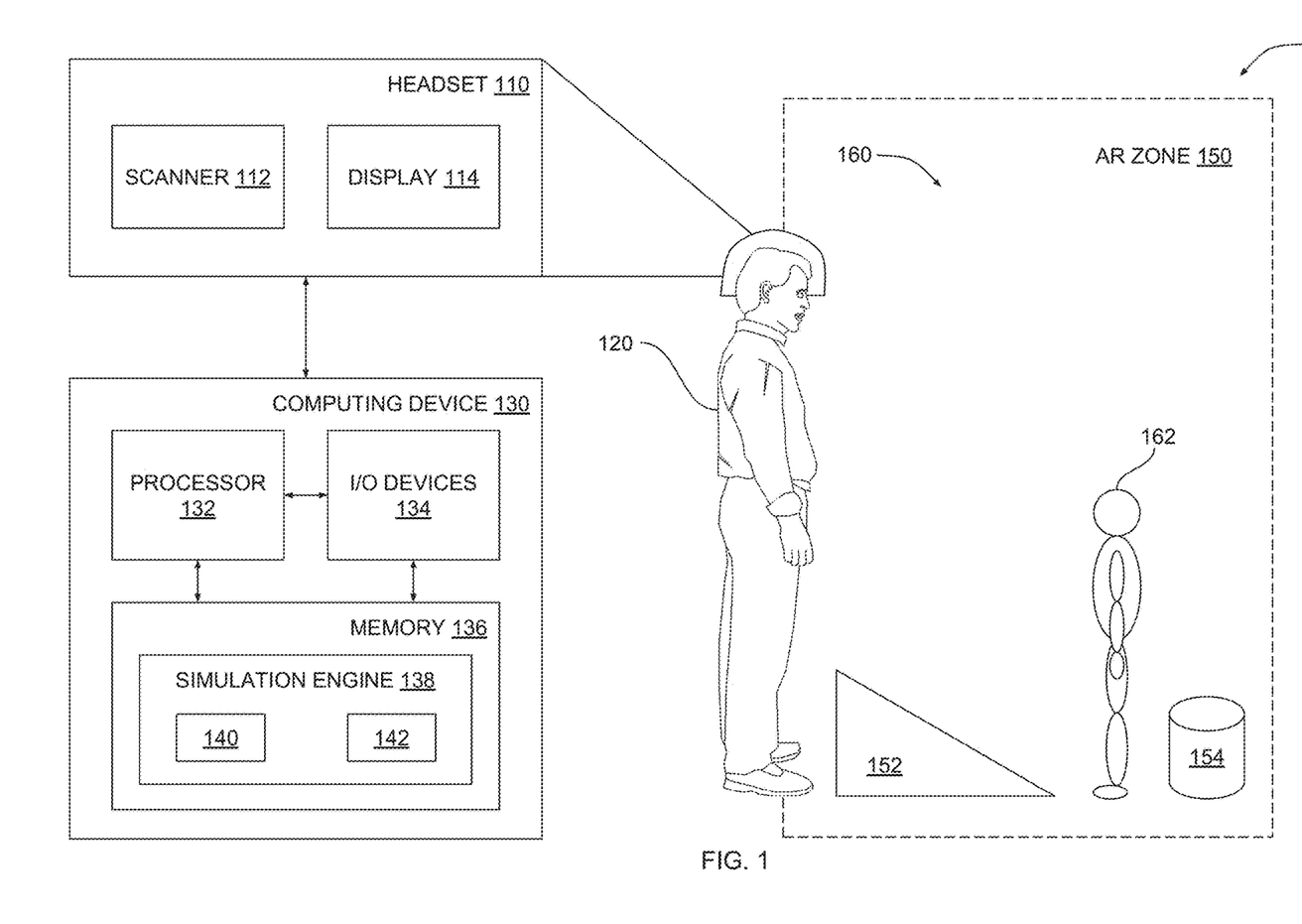
FIG. 1 illustrates a system configured to implement one or more aspects of the various embodiments.

FIG. 1 illustrates a system configured to implement one or more aspects of the various embodiments. As shown, a system 100 includes a headset 110 configured to be worn by a user 120. Headset includes a scanner 112 and a display 114. Headset 110 is coupled to a computing device 130. Computing device 130 includes a processor 132, input/output (I/O) devices 134, and a memory 136, coupled together. Memory 136 includes a simulation engine 138.

Processor 132 as a hardware unit configure to process data and execute program instructions. I/O devices 134 includes devices for receiving input, devices for producing output, and devices that perform a dual purpose of receiving input and producing output. Memory 136 includes any technically feasible computer-readable storage medium. Simulation engine 138 is a software application including program instructions that, when executed by processor 132, coordinate any of the various operations described herein. Simulation engine 138 includes an environment model 140 and a character model 142.

Headset 110 and computing device 130 interoperate with one another in order to generate and render various simulated elements that appear, from the perspective of user 120, to reside within an AR zone 150. AR zone 150 is a region of the real-world environment proximate to user 120. AR zone 150 may include various real-world objects 152 and 154. AR zone may also appear to include simulated elements associated with an AR simulation 160, such as a simulated character 162.

In operation, scanner 112 captures images associated with AR zone 150. Simulation engine 138 process the captured images to generate and render simulated character 162 within AR simulation 160. Simulation engine 138 then causes display 114 to output AR simulation 160 to user 120. Display 114 is a pass-through device which allows light emitted from within AR zone 150 to reach the eyes of user 120 while also projecting light associated with AR simulation 160 to the eyes of user 120. Accordingly, user 120 may perceive real-world objects 152 and 154 along with simulated character 162.

Simulation engine 138 also models interactions between simulated character 162 and real-world objects within AR zone 150 using environment model 140 and character model 142. In doing so, simulation engine 138 generates environment model 140 by scanning the real-world objects included in AR zone 150 to generate a library of object models. Each object model included in the library describes geometry and texture(s) of a corresponding real-world object. Simulation engine 138 may generate the library of object models in an offline process, or, alternatively, may generate this library in real time via scanner 112.

Simulation engine 138 may recognize the various real-world objects within AR zone 150 and then identify the particular object model(s) corresponding to each such object. For each object model, simulation engine 138 projects the corresponding object model onto the real-world object so that the geometry of the object model aligns with the geometry of the real-world object. Simulation engine 138 may perform this process within the context of AR simulation 160, although simulation engine 138 need not display the object models to user 120.

Simulation engine 138 may then model interactions between simulated character 162 and any real-world objects in AR zone 150 by adjusting the kinematics of simulated character 162 based on the object models corresponding to those real-world objects. Because the object models are geometrically aligned to the corresponding real-world objects, the adjusted kinematics of simulated character 162 may appear physically realistic relative to those real-world objects. Modeling interactions in this manner allows simulated character 162 to perform various actions relative to real-world objects without causing AR simulation 160 to display unrealistic intersections and other disruptive artifacts. To perform the above-described process, simulation engine 138 implements specific modules that are described in greater detail below in conjunction with FIGS. 2-3.

Figure 2:
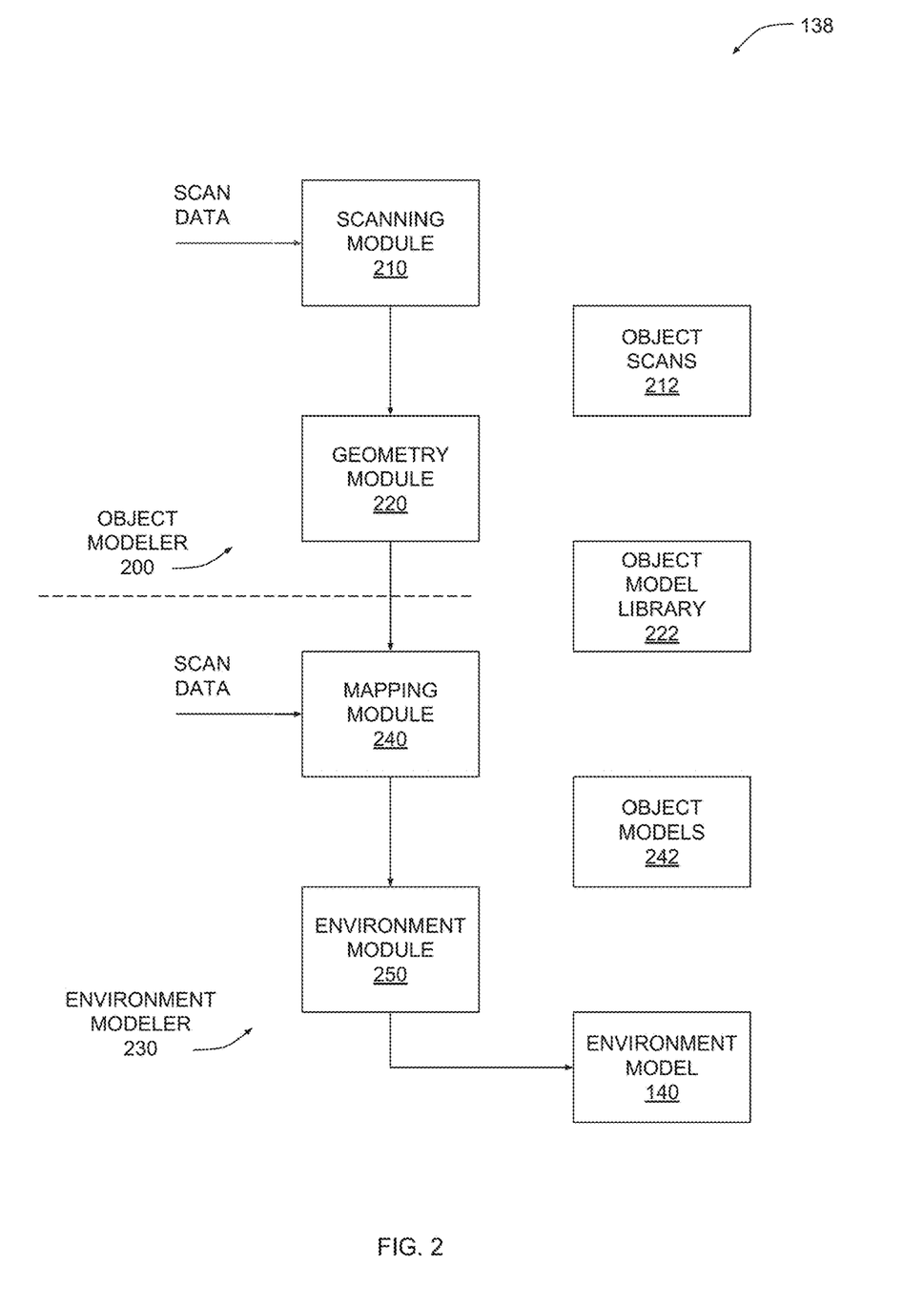
FIG. 2 is a more detailed illustration of the simulation engine of FIG. 1, according to various embodiments.

FIG. 2 is a more detailed illustration of the simulation engine of FIG. 1, according to various embodiments. As shown, the simulation engine 138 includes an object modeler 200 and an environment modeler 230. Object modeler 200 includes a scanning module 210 and a geometry module 220. Environment modeler 230 includes a mapping module 240 and an environment module 250.

In operation, scanning module 210 scans real-world objects to generate object scans 212. Scanning module 210 may interact with scanner 112 shown in FIG. 1 to generate object scans 212 based on real-time scan data, i.e. during generation of AR simulation 160. Alternatively, scanning module 210 may scan real-world objects in an offline process prior to generation of AR simulation 160. Object scans 212 include video imagery of various real-world objects captured from multiple perspectives. Instances of those objects may reside within AR zone 150.

Geometry module 220 processes object scans 212 to generate object model library 222. In doing so, geometry module 220 generates a different object model within the library based on each different object scan 212, and, thus, for each different scanned real-world object. A given object model includes geometry and/or textures generated to represent the corresponding real-world object. Geometry module 220 generates geometry for a given real-world object by deriving the dimensions of the object from the corresponding object scan 212. Geometry module 220 may generate one or more textures for a given real-world object by analyzing surfaces of that object depicted in the corresponding object scan 212. Geometry module 220 may perform the above techniques to generate object model library 222 in real-time or, alternatively, via an offline process.

Once the various modules of object modeler 200 generate object model library 222 in the manner described above, other modules included in environment modeler 230 interoperate to generate environment model 140.

In particular, mapping module 240 analyzes scan data that is captured by scanner 112 representing AR zone 150. Mapping module 240 analyzes this data to identify specific real-world objects for which a corresponding object model 242 exists within object model library 222. Mapping module 240 may implement a variety of possible pattern recognition techniques to identify object models 242 corresponding to real-world objects within AR zone 150. For example, mapping module 240 could analyze the scan data to identify individual real-world objects within AR zone 150. Then, mapping module 240 could identify a set of features associated with each real-world object, including various points, lines, and surfaces. Finally, mapping module 240 could identify any object models 242 having a similar set of features. In doing so, mapping module 240 could also identify features having similar or equivalent dimensions to those associated with the identified real-world objects. In this manner, mapping module 240 maps portions of AR zone 150 to specific object models 242.

Based on object models 242, environment module 250 generates environment model 140. Environment module 250 projects each object model 242 onto the corresponding real-world object such that the geometry of any given object model 242 is aligned with the geometry of the corresponding real-world object. In this manner, environment module 250 creates a geometrical representation of AR zone 150 and/or the real-world objects within that zone. Simulation engine 128 need not explicitly display environment model 140 to user 120, although doing so is conceivable. Simulation engine 138 uses environment model 140 to adapt kinematics described in character model 142 for the purpose of modeling physically realistic interactions between simulated character 162 and real-world objects modeled via environment model 140. This process is described in greater detail below in conjunction with FIG. 3.

Figure 3:
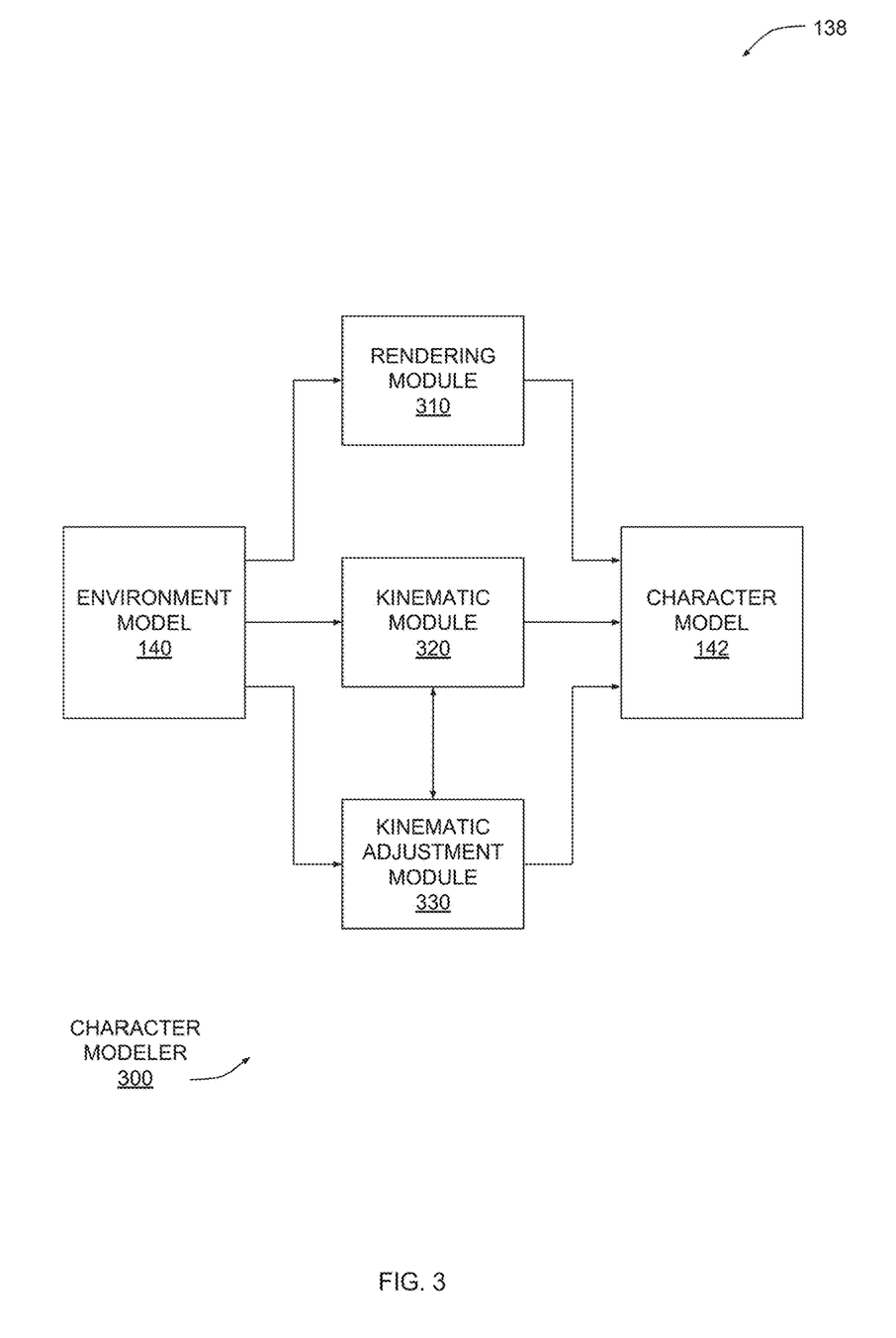
FIG. 3 is a more detailed illustration of the simulation engine of FIG. 1, according to other various embodiments.

FIG. 3 is a more detailed illustration of the simulation engine of FIG. 1, according to other various embodiments. As shown, simulation engine 138 also includes a character modeler 300 that includes a rendering module 310, a kinematic module 320, and a kinematic adjustment module 330. These various modules interoperate to process environment model 140 and generate character model 142.

Character model 142 is a multi-faceted data structure describing the appearance of simulated character 162 as well as various kinematic and dynamic properties associated with simulated character 162. For example, character model 162 could include a three-dimensional mesh and corresponding texture maps depicting the external appearance of simulated character 162. In addition, character model 162 could also include geometry describing a skeleton associated with simulated character 162, including various rods coupled together by joints, as well as different parameters describing interactions between these elements. Character model 162 could further include kinematic equations describing how those elements move relative to one another.

Rendering module 310 may process environment model 140 and then render the physical appearance of character model 142 in a manner that is visually consistent with AR zone 150, accounting for lighting, ambient colors, and so forth. Kinematic module 320 may process environment model 140 and then solve, in real time, a set of kinematic and/or dynamic equations describing the motion of simulated character 162 within AR zone 150. In doing so, kinematic module 320 may implement a ragdoll model of simulated character 162 in order to simulate physically realistic movements.

Kinematic module 320 may also interoperate with kinematic adjustment module 330 in order to adjust the kinematics and/or dynamics of simulated character 162 relative to object models 242 included in environment model 140. In doing so, kinematic module 320 may generate a new kinematic model of simulated character 162 by adjusting, via kinematic adjustment module 330, a previous kinematic model of simulated character 162. In this manner, kinematic adjustment module 330 allows character model 142 to appear to adapt to real-world objects within AR zone 150 that are, in fact, modeled within AR simulation 160 via object models 242. This process is described in greater detail by way of example below in conjunction with FIGS. 4-9.

Exemplary Movements of a Simulated Character

Figure 4:
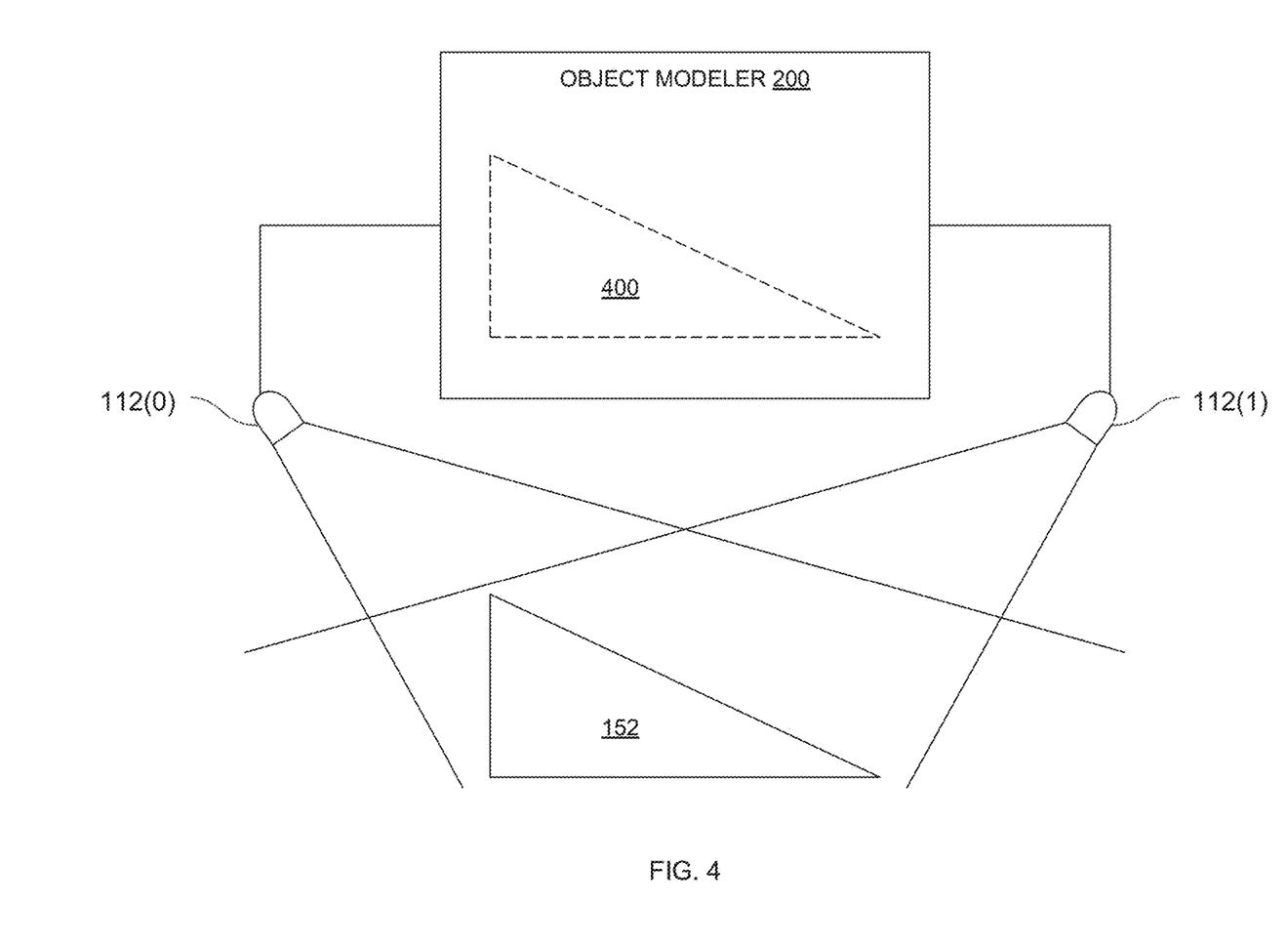
FIG. 4 illustrates how an object model is generated from a real-world object, according to various embodiments.

FIG. 4 illustrates how an object model is generated from a real-world object, according to various embodiments. As shown, object modeler 200 is configured to scan real-world object 152 to generate an object model 400. Object model 400 includes geometry representing the dimensions of real-world object 152, as well as texture maps describing the surface of that object. In the embodiment shown, object modeler 200 may capture scan data via scanners 112(0) and 112(1) during generation of AR simulation 160. In another embodiment, object modeler 200 may capture scan data using an offline scanner that need not be associated with headset 110. Once object modeler 200 generates object model 400, environment modeler 230 may then generate environment model 140, as described in greater detail below in conjunction with FIG. 5.

Figure 5:
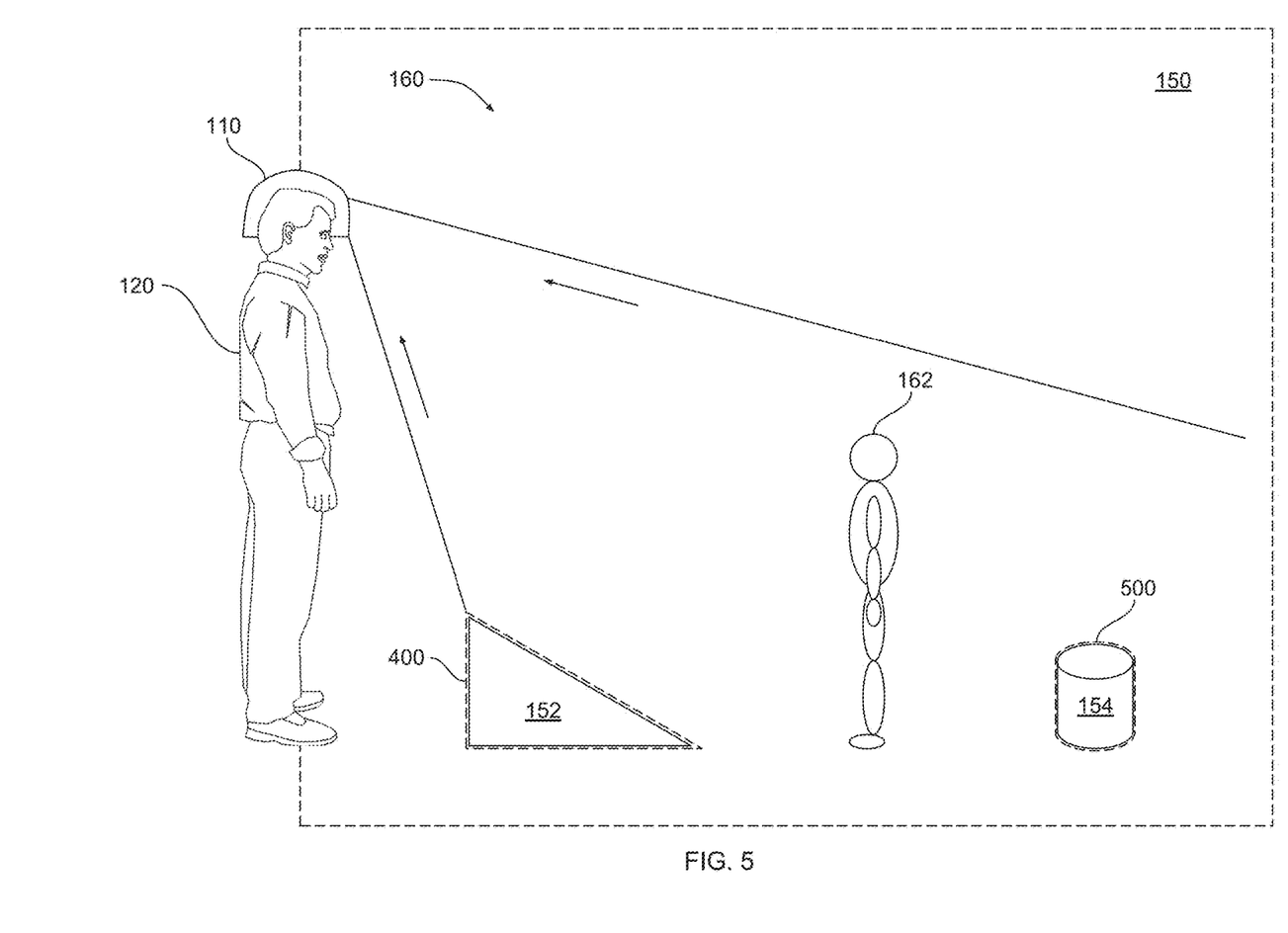
FIG. 5 illustrates how an environment model is generated from one or more object models, according to various embodiments.

FIG. 5 illustrates how an environment model is generated from one or more object models, according to various embodiments. As shown, object model 400 and object model 500 reside within AR simulation 160. These object models form at least a portion of environment model 140. Object model 500 is generated by scanning real-world object 154 using the process described above in conjunction with FIG. 5. Environment modeler 230 generates environment model 140 by projecting object models 400 and 500 onto the corresponding real-world objects 152 and 154, respectively. In doing so, environment modeler 230 aligns the geometry of object models 400 and 500 to the geometry of real-world objects 152 and 154.

In practice, environment modeler 230 scans AR zone 150 and then implements a pattern recognition algorithm to determine that object models exist within object model library 222 corresponding to real-world objects 152 and 154. Environment modeler 230 also determines the physical locations and orientations of real-world objects 152 and 154 and then projects the corresponding object models into AR simulation 160 with those same locations and orientations.

Character modeler 300 may then generate and/or update the kinematics of simulated character 162 based on those object models when simulated character 162 encounters and/or interacts with the corresponding real-world objects. FIGS. 6-9 depict examples of such interactions.

Figure 6:
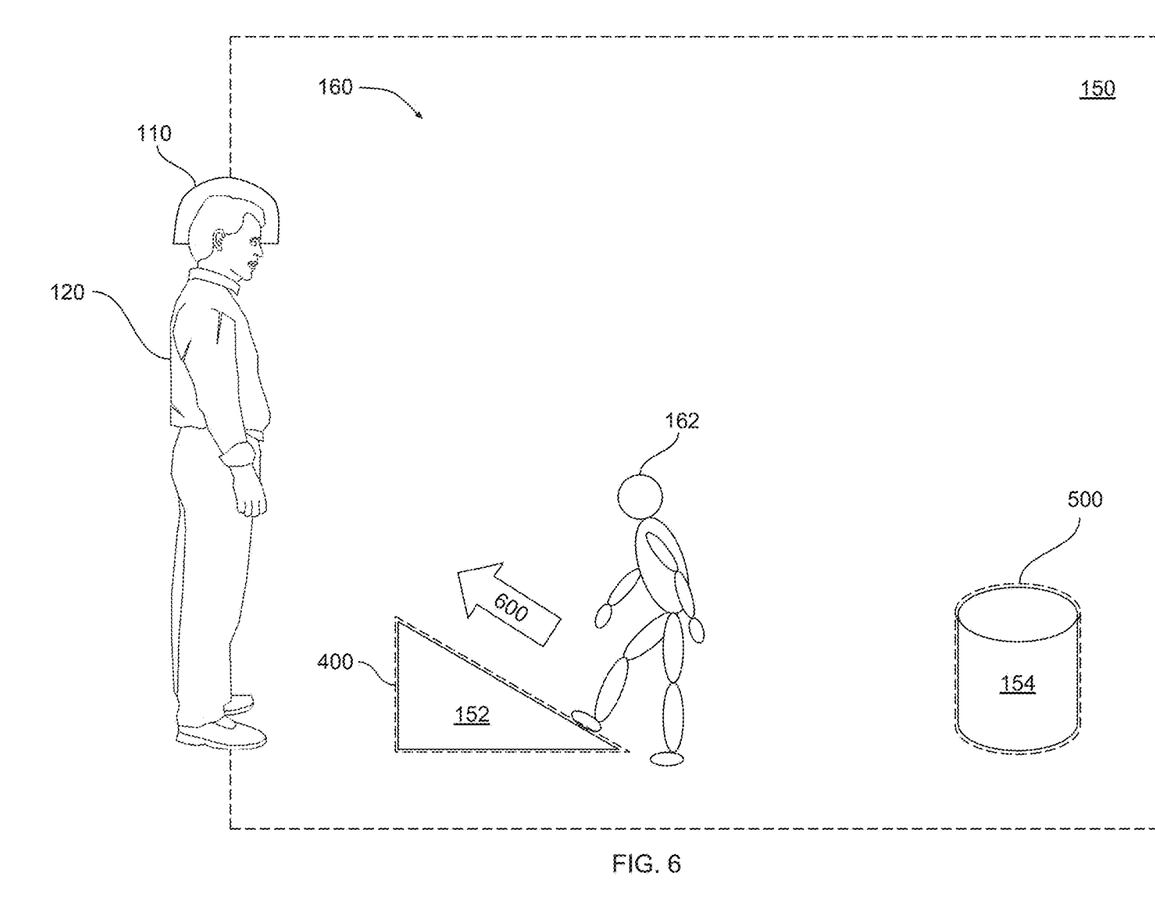
FIG. 6 illustrates how the simulated character of FIG. 1 is adapted to a stationary real-world object, according to various embodiments.

FIG. 6 illustrates how the simulated character of FIG. 1 is adapted to a stationary real-world object, according to various embodiments. As shown, simulated character 162 moves along a trajectory 600 towards user 120. During locomotion, simulated character 162 appears to encounter real-world object 152. To simulate an interaction between simulated character 162 and real-world object 152, simulation engine 138 adjusts the dynamics and/or kinematics of simulated character 162 based on the geometry of object model 400. Simulation engine 138 may implement an inverse kinematic model to adjust the properties of simulated character 162. Because object model 400 is geometrically aligned to real-world object 152, simulated character 162 appears to ascend real world object 152 in a physically realistic manner.

Figure 7:
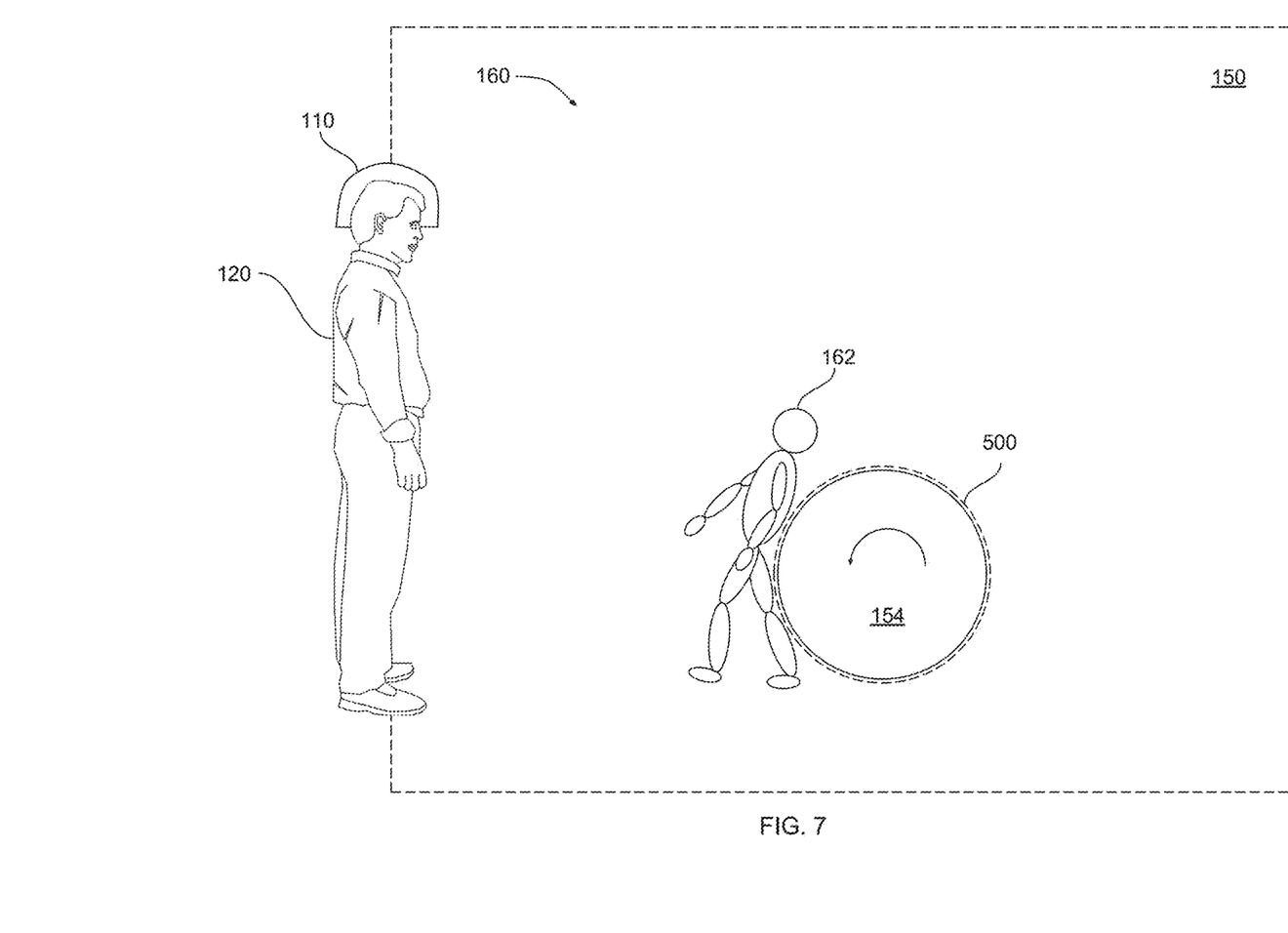
FIG. 7 illustrates how the simulated character of FIG. 1 is adapted to a dynamic real-world object, according to various embodiments.

FIG. 7 illustrates how the simulated character of FIG. 1 is adapted to a dynamic real-world object, according to various embodiments. As shown, simulated character 162 appears to collide with real-world object 154 as real-world object 154 rolls along the ground. To simulate a physically realistic impact, simulation engine 138 adjusts the dynamics and/or kinematics of simulated character 162 based on the geometry of object model 500. Simulation engine 162 may dynamically update character model 142 in performing this adjustment. Simulation engine 138 may also update the kinematics of simulated character 162 based on a ragdoll model of that character in order to produce smooth transitions between poses. Another example of this approach is shown in FIG. 8.

Figure 8:
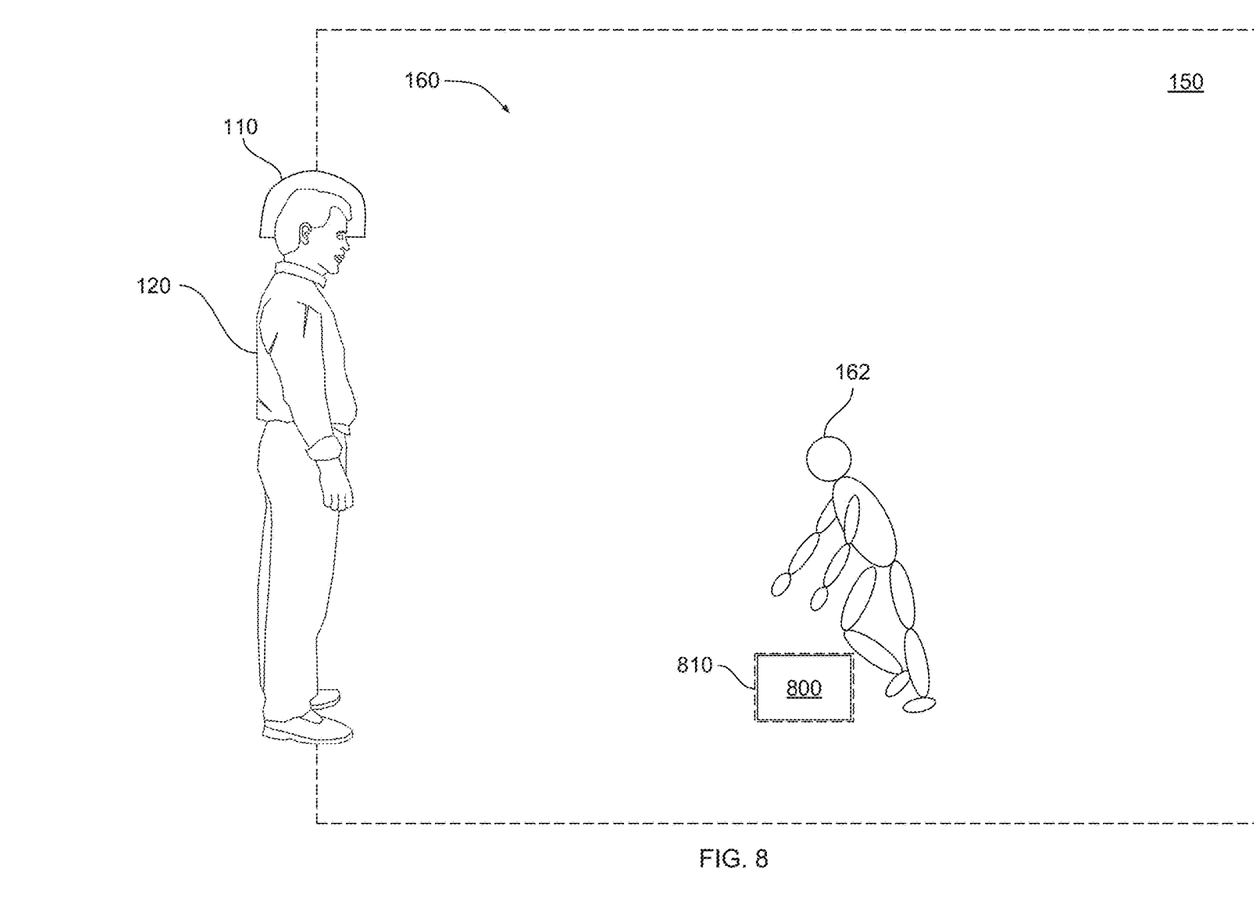
FIG. 8 illustrates how the simulated character of FIG. 1 is adapted to a stationary real-world object via ragdoll dynamics, according to various embodiments.

FIG. 8 illustrates how the simulated character of FIG. 1 is adapted to a stationary real-world object via ragdoll dynamics, according to various embodiments. As shown, simulated character 162 appears to trip over real-world object 800. Simulation engine 138 relies on object model 810 to simulate this interaction. Simulation engine 138 may determine that the leg of simulated character 162 intersects, or approaches an intersection with, object model 810. Then, simulation engine 138 adjusts character model 142 based on a ragdoll model of simulated character 162 to simulate falling behavior.

Referring generally to FIGS. 6-8, simulation engine 138 may detect potential interactions between simulated character 162 and a given real-world object within AR zone 150 by identifying that a portion of simulated character 162 approaches a boundary of the corresponding object model. In some embodiments, simulation engine 138 may expand an object model slightly to provide a buffer surrounding the corresponding real-world object. The size of this buffer may be configurable, and could be based on the dynamics of simulated character 162. For example, simulation engine 138 could cause a given object model to be slightly larger than the corresponding real-world object when simulated character 162 moves quickly within AR simulation 160. This approach may provide additional protection against physically unrealistic intersections between simulated character 162 and real-world objects.

Figure 9:
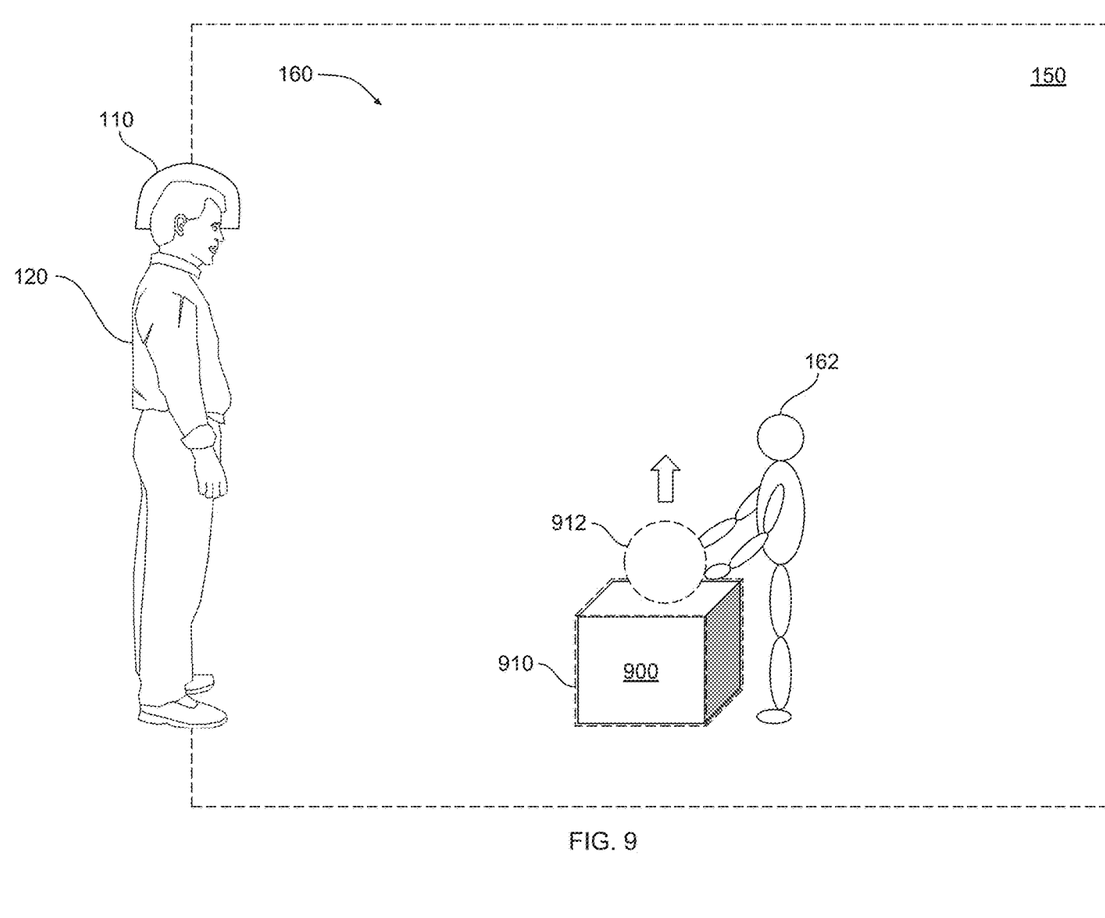
FIG. 9 illustrates how the simulated character of FIG. 1 performs a complex interaction with a real-world object, according to various embodiments.

FIG. 9 illustrates how the simulated character of FIG. 1 performs a complex interaction with a real-world object, according to various embodiments. In addition to the simple interactions described above, simulation engine 138 may also support more complex interactions between simulated character 162 and various real-world objects.

As shown, simulated character 162 appears to interact with a real-world object 900. Simulation engine 138 projects object model 910 onto real-world object 900. Object model 910 geometrically represents real-world object 900. However, object model 910 is more complex than real-world object 900. In particular, object model 910 includes an additional simulated element 912 with which simulated character 162 can interact. As is shown, simulated character 162 appears to lift simulated element 912 out of real-world object 900. Simulated element 912 need not represent an actual real-world object. In fact, real-world object 900 could be empty. However, inclusion of simulated element 912 within object model 910 may provide an added sense of realism to AR simulation 160.

Modeling Interactions Between a Simulated Character and a Real-World Object

Figure 10:
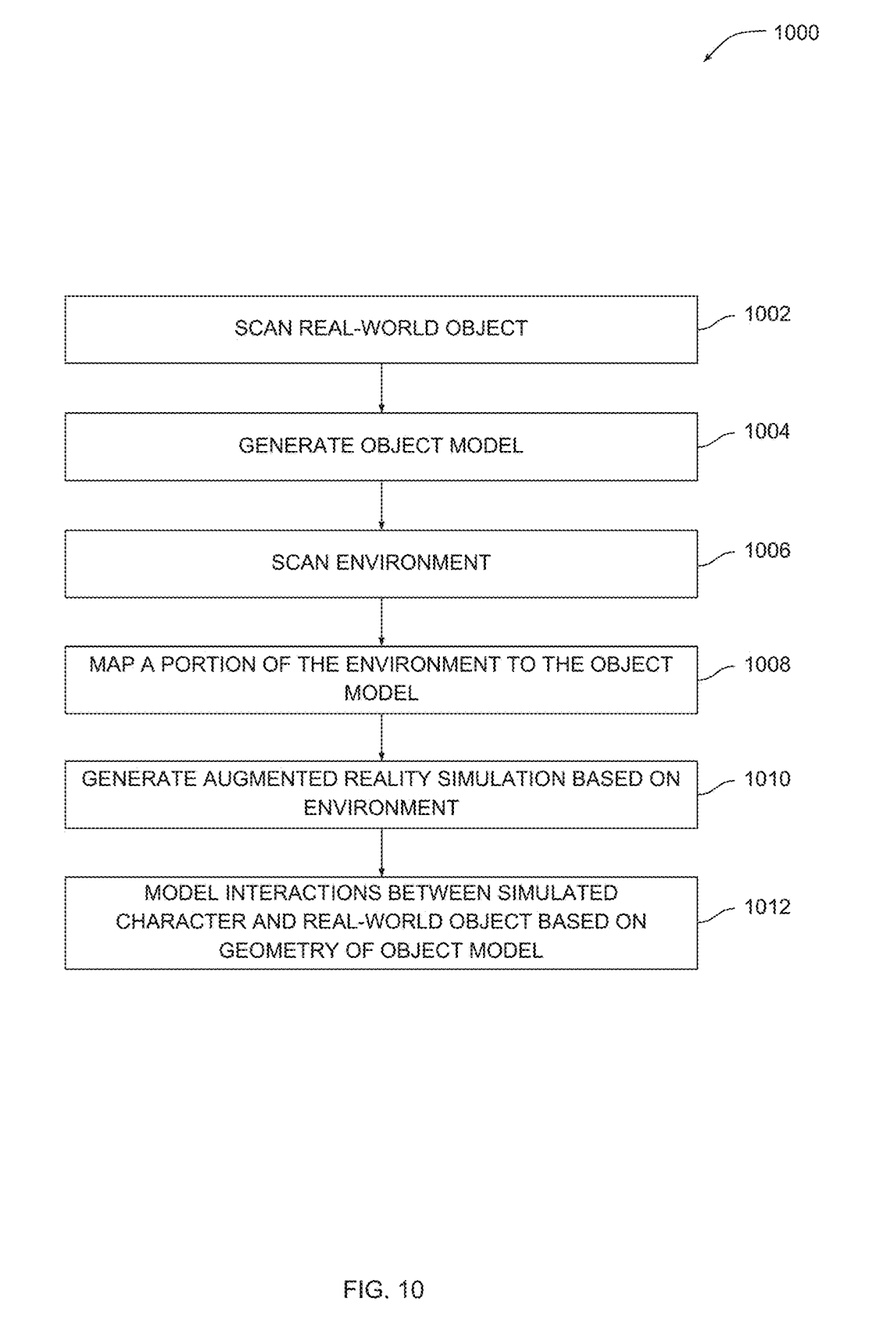
FIG. 10 is a flow diagram of method steps for generating a model of the interactions between a simulated character and a real-world object, according to various embodiments.

FIG. 10 is a flow diagram of method steps for generating a model of the interactions between a simulated character and a real-world object, according to various embodiments. Although the method steps are described in conjunction with the systems of FIGS. 1-9, persons skilled in the art will understand that any system may be configured to perform the method steps in any order.

As shown, a method 1000 begins at step 1002, where simulation engine 138 scans a real-world object. Simulation engine 138 may scan the real-world object in real time during generation of an AR simulation, or, alternatively, may scan the real-world object in an off-line process. At step 1004, simulation engine generates an object model based on scanning the real-world object. The object model includes geometry and/or textures describing the real-world object.

At step 1006, simulation engine 138 scans a region of the environment. At step 1008, simulation engine 138 maps a portion of the environment to the object model. To do so, simulation engine 138 identifies a real-world object within the region of the environment that corresponds to the object model. At step 1010, simulation engine 138 generates an AR simulation based on the environment that includes the object model geometrically aligned to the portion of the environment. In this manner, simulation engine 138 generates a model of the environment that includes the object model.

At step 1012, simulation engine 138 models interactions between a simulated character within the AR simulation and the real-world object based on the geometry of the corresponding object model. In doing so, simulation engine 138 adjusts the kinematics and/or dynamics of the simulated character relative to the object model associated with the real-world object.

In sum, a simulation engine models interactions between simulated elements and real-world objects to produce a physically realistic AR simulation. Initially, the simulation engine generates a library of object models by scanning a set of real-world objects. The simulation engine then generates the AR simulation to appear within a region of the environment that includes one or more of those real-world objects. The simulation engine recognizes a given real-world object residing in this region and then identifies an object model corresponding to that object.

Within the AR simulation, the simulation engine projects the object model onto the real-world object such that the object model is geometrically aligned with the real-world object. The simulation engine performs this projection process with each real-world object included in the region of the environment where the AR simulation is generated to appear. The simulation engine may then cause simulated elements to appear within the AR simulation, including static elements such as simulated objects, as well as dynamic elements, such as simulated characters. When a given simulated element encounters a real-world object, the simulation engine models interactions between the simulated element and the real-world object by adjusting the kinematics of the simulated element relative to the object model associated with the real-world object. Because the object model is geometrically aligned to the real-world object, the simulation engine can model these interactions in a manner that is highly precise and therefore capable of avoiding intersections between the simulated element and the real-world object.

At least one advantage of the disclosed techniques is that the simulation engine produces AR simulations that are more physically realistic compared to conventional AR simulations. In particular, the simulated elements generated by the simulation engine may appear to interact with real-world objects in a realistic manner without physically intersecting with those objects. Accordingly, the disclosed techniques represent a technological advancement compared to previous approaches, because previous approaches cause unrealistic behavior that is disruptive to the user experience.

1. Some embodiments include a computer-implemented method for generating simulated characters within augmented reality (AR) simulations, the method comprising: mapping a first real-world object to a first object model, wherein the first object model includes first geometry corresponding to the structure of the first real-world object, projecting the first geometry onto the first real-world object within an AR simulation, determining that a first portion of a simulated character included in the AR simulation occupies a first position within the AR simulation that is associated with the first real-world object, and generating a kinematic model of the simulated character based on the first object model, wherein the kinematic model of the simulated character models an interaction between the simulated character and the first real-world object, and wherein the simulated character is subsequently displayed to a user via an AR headset.

2. The computer-implemented method of clause 1, further comprising generating the first object model by: capturing video imagery of the first real-world object from a plurality of perspectives, and analyzing the video imagery to determine a set of physical dimensions associated with the first real-world object.

3. The computer-implemented method of any of clauses 1 and 2, further comprising analyzing the video imagery to generate a first texture map that describes a first surface of the first object model.

4. The computer-implemented method of any of clauses 1, 2, and 3, wherein mapping the first real-world object to the first object model comprises: scanning a first region of space to identify the first real-world object, determining a first set of features associated with the first real-world object, and determining that the first object model includes at least one feature included in the first set of features.

5. The computer-implemented method of any of clauses 1, 2, 3, and 4, wherein determining that the first portion of the simulated character occupies a first position within the AR simulation comprises determining that the first portion of the simulated character intersects the first object model.

6. The computer-implemented method of any of clauses 1, 2, 3, 4, and 5, wherein generating the kinematic model of the simulated character comprises performing an inverse kinematic operation on a previous kinematic model of the simulated character based on the first geometry.

7. The computer-implemented method of any of clauses 1, 2, 3, 4, 5, and 6, wherein the first real-world object comprises an inclined plane, and generating the kinematic model of the simulated character causes the simulated character to ascend the first object model within the AR simulation.

8. The computer-implemented method of any of clauses 1, 2, 3, 4, 5, 6, and 7, wherein the first real-world object comprises a dynamically moving object, and generating the kinematic model of the simulated character causes the simulated character to move in response to a collision with the first object model.

9. The computer-implemented method of any of clauses 1, 2, 3, 4, 5, 6, 7 and 8, wherein the first real-world object comprises a static object, and generating the kinematic model of the simulated character comprises applying a ragdoll model of the simulated character to a previous kinematic model of the simulated character in response to a collision between the simulated character and the first object model.

10. The computer-implemented method of any of clauses 1, 2, 3, 4, 5, 6, 7, 8, and 9, wherein generating the kinematic model of the simulated character causes the simulated character to extract a simulated element from the first object model.

11. Some embodiments include a non-transitory computer-readable medium storing program instructions that, when executed by a processor, cause the processor to generate simulated characters within augmented reality (AR) simulations by performing the steps of: mapping a first real-world object to a first object model, wherein the first object model includes first geometry corresponding to the structure of the first real-world object, projecting the first geometry onto the first real-world object within an AR simulation, determining that a first portion of a simulated character included in the AR simulation occupies a first position within the AR simulation that is associated with the first real-world object, and generating a kinematic model of the simulated character based on the first object model, wherein the kinematic model of the simulated character models an interaction between the simulated character and the first real-world object, and wherein the simulated character is subsequently displayed to a user via an AR headset.

12. The non-transitory computer-readable medium of clause 11, further comprising generating the first object model by: capturing video imagery of the first real-world object from a plurality of perspectives, and analyzing the video imagery to determine a set of physical dimensions associated with the first real-world object.

13. The non-transitory computer-readable medium of any of clauses 11 and 12, further comprising the step of analyzing the video imagery to generate a first texture map that describes a first surface of the first object model.

14. The non-transitory computer-readable medium of any of clauses 11, 12, and 13, wherein the step of mapping the first real-world object to the first object model comprises: scanning a first region of space to identify the first real-world object, determining a first set of features associated with the first real-world object, and determining that the first object model includes at least one feature included in the first set of features.

15. The non-transitory computer-readable medium of any of clauses 11, 12, 13, and 14, wherein the step of determining that the first portion of the simulated character occupies a first position within the AR simulation comprises determining that the first portion of the simulated character intersects the first object model.

16. The non-transitory computer-readable medium of any of clauses 11, 12, 13, 14, and 15, wherein the step of generating the kinematic model of the simulated character comprises performing an inverse kinematic operation on a previous kinematic model of the simulated character based on the first geometry.

17. The non-transitory computer-readable medium of any of clauses 11, 12, 13, 14, 15, and 16, wherein the step of generating the kinematic model of the simulated character causes the simulated character to extract a simulated element from the first object model.

18. The non-transitory computer-readable medium of any of clauses 11, 12, 13, 14, 15, 16, and 17, wherein the step of generating the kinematic model of the simulated character prevents any portion of the simulated character from occupying a second position within the AR simulation that is associated with the first real-world object.

19. The non-transitory computer-readable medium of any of clauses 11, 12, 13, 14, 15, 16, 17, and 18, wherein the AR simulation is associated with a first region of space that includes the first real-world object.

20. Some embodiments include a system, comprising: a memory storing a simulation engine, and a processor that, when executing the simulation engine, is configured to perform the steps of: mapping a first real-world object to a first object model, wherein the first object model includes first geometry corresponding to the structure of the first real-world object, projecting the first geometry onto the first real-world object within an AR simulation, determining that a first portion of a simulated character included in the AR simulation occupies a first position within the AR simulation that is associated with the first real-world object, and generating a kinematic model of the simulated character based on the first object model, wherein the kinematic model of the simulated character models an interaction between the simulated character and the first real-world object, and wherein the simulated character is subsequently displayed to a user via an AR headset.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating simulated characters within augmented reality (AR) simulations, the method comprising:
  mapping a first real-world object to a first object model, wherein the first object model includes first geometry corresponding to the structure of the first real-world object;

projecting the first geometry onto the first real-world object within an AR simulation;
determining that a first portion of a simulated character included in the AR simulation occupies a first position within the AR simulation that is associated with the first real-world object; and
generating a kinematic model of the simulated character based on the first object model, wherein the kinematic model of the simulated character models an interaction between the simulated character and the first real-world object, and wherein the simulated character is subsequently displayed to a user via an AR headset.

2. The computer-implemented method of claim 1, further comprising generating the first object model by:
capturing video imagery of the first real-world object from a plurality of perspectives; and
analyzing the video imagery to determine a set of physical dimensions associated with the first real-world object.

3. The computer-implemented method of claim 2, further comprising analyzing the video imagery to generate a first texture map that describes a first surface of the first object model.

4. The computer-implemented method of claim 1, wherein mapping the first real-world object to the first object model comprises:
scanning a first region of space to identify the first real-world object;
determining a first set of features associated with the first real-world object; and
determining that the first object model includes at least one feature included in the first set of features.

5. The computer-implemented method of claim 1, wherein determining that the first portion of the simulated character occupies a first position within the AR simulation comprises determining that the first portion of the simulated character intersects the first object model.

6. The computer-implemented method of claim 1, wherein generating the kinematic model of the simulated character comprises performing an inverse kinematic operation on a previous kinematic model of the simulated character based on the first geometry.

7. The computer-implemented method of claim 1, wherein the first real-world object comprises an inclined plane, and generating the kinematic model of the simulated character causes the simulated character to ascend the first object model within the AR simulation.

8. The computer-implemented method of claim 1, wherein the first real-world object comprises a dynamically moving object, and generating the kinematic model of the simulated character causes the simulated character to move in response to a collision with the first object model.

9. The computer-implemented method of claim 1, wherein the first real-world object comprises a static object, and generating the kinematic model of the simulated character comprises applying a ragdoll model of the simulated character to a previous kinematic model of the simulated character in response to a collision between the simulated character and the first object model.

10. The computer-implemented method of claim 1, wherein generating the kinematic model of the simulated character causes the simulated character to extract a simulated element from the first object model.

11. A non-transitory computer-readable medium storing program instructions that, when executed by a processor, cause the processor to generate simulated characters within augmented reality (AR) simulations by performing the steps of:
mapping a first real-world object to a first object model, wherein the first object model includes first geometry corresponding to the structure of the first real-world object;
projecting the first geometry onto the first real-world object within an AR simulation;
determining that a first portion of a simulated character included in the AR simulation occupies a first position within the AR simulation that is associated with the first real-world object; and
generating a kinematic model of the simulated character based on the first object model, wherein the kinematic model of the simulated character models an interaction between the simulated character and the first real-world object, and wherein the simulated character is subsequently displayed to a user via an AR headset.

12. The non-transitory computer-readable medium of claim 11, further comprising generating the first object model by:
capturing video imagery of the first real-world object from a plurality of perspectives; and
analyzing the video imagery to determine a set of physical dimensions associated with the first real-world object.

13. The non-transitory computer-readable medium of claim 12, further comprising the step of analyzing the video imagery to generate a first texture map that describes a first surface of the first object model.

14. The non-transitory computer-readable medium of claim 11, wherein the step of mapping the first real-world object to the first object model comprises:
scanning a first region of space to identify the first real-world object;
determining a first set of features associated with the first real-world object; and
determining that the first object model includes at least one feature included in the first set of features.

15. The non-transitory computer-readable medium of claim 11, wherein the step of determining that the first portion of the simulated character occupies a first position within the AR simulation comprises determining that the first portion of the simulated character intersects the first object model.

16. The non-transitory computer-readable medium of claim 11, wherein the step of generating the kinematic model of the simulated character comprises performing an inverse kinematic operation on a previous kinematic model of the simulated character based on the first geometry.

17. The non-transitory computer-readable medium of claim 11, wherein the step of generating the kinematic model of the simulated character causes the simulated character to extract a simulated element from the first object model.

18. The non-transitory computer-readable medium of claim 11, wherein the step of generating the kinematic model of the simulated character prevents any portion of the simulated character from occupying a second position within the AR simulation that is associated with the first real-world object.

19. The non-transitory computer-readable medium of claim 11, wherein the AR simulation is associated with a first region of space that includes the first real-world object.

20. A system, comprising:
a memory storing a simulation engine; and
a processor that, when executing the simulation engine, is configured to perform the steps of:

mapping a first real-world object to a first object model, wherein the first object model includes first geometry corresponding to the structure of the first real-world object, projecting the first geometry onto the first real-world object within an AR simulation, determining that a first portion of a simulated character included in the AR simulation occupies a first position within the AR simulation that is associated with the first real-world object, and generating a kinematic model of the simulated character based on the first object model, wherein the kinematic model of the simulated character models an interaction between the simulated character and the first real-world object, and wherein the simulated character is subsequently displayed to a user via an AR headset.

* * * * *

UNITED STATES PATENT AND TRADEMARK OFFICE
CERTIFICATE OF CORRECTION

PATENT NO. : 10,445,940 B2
APPLICATION NO. : 15/922820
DATED : October 15, 2019
INVENTOR(S) : Martin Guay et al.

Page 1 of 1

It is certified that error appears in the above-identified patent and that said Letters Patent is hereby corrected as shown below:

On the Title Page

Page 2, (56) Other Publications, Column 2, Lines 20-23:
Please delete "Zeng et al., "Aristo: An Augmented Reality Platform for Immersion and Interactivity", MM '17, Oct. 23-27, 2017, Mount View, CA, USA, © 2017 Association for Computing Machinery, 9 pages, https://doi.org/10.1145/3123266.3123308." and insert --Zheng et al., "Aristo: An Augmented Reality Platform for Immersion and Interactivity", MM '17, Oct. 23-27, 2017, Mountain View, CA, USA, © 2017 Association for Computing Machinery, 9 pages, https://doi.org/10.1145/3123266.3123308.--.

Signed and Sealed this
Twenty-fourth Day of December, 2019

Andrei Iancu
*Director of the United States Patent and Trademark Office*